United States Patent [19]
McCormick

[11] 3,959,069
[45] May 25, 1976

[54] METHOD OF PREPARING GAS TAGS FOR IDENTIFICATION OF SINGLE AND MULTIPLE FAILURES OF NUCLEAR REACTOR FUEL ASSEMBLIES

[75] Inventor: Norman J. McCormick, Seattle, Wash.

[73] Assignee: The United States of America as represented by the United States Energy Research and Development Administration, Washington, D.C.

[22] Filed: June 5, 1974

[21] Appl. No.: 476,500

[52] U.S. Cl............................ 176/19 LD; 176/19 R; 176/80
[51] Int. Cl.² ....................................... G21C 17/06
[58] Field of Search ................ 176/19 R, 19 LD, 80

[56] References Cited
UNITED STATES PATENTS
3,157,580 11/1964 Williams .......................... 176/80 X
3,663,363 5/1972 Crouthamel et al. ............. 176/80 X FOREIGN PATENTS OR APPLICATIONS
896,889    1/1960    United Kingdom ............ 176/19 LD
898,219    12/1958   United Kingdom ............ 176/19 LD
939,714    10/1963   United Kingdom ................ 176/80
1,100,723  1/1968    United Kingdom ................ 176/80

OTHER PUBLICATIONS
McCormack et al., Gas Tag Identification of Failed Fuel – I. Synergistic Use of Inert Gases, Nuclear Technology, Vol. 24, Nov. 1974, p. 149.

Primary Examiner—Samuel W. Engle
Assistant Examiner—Peter A. Nelson
Attorney, Agent, or Firm—Dean E. Carlson; Robert M. Poteat

[57] ABSTRACT

For use in the identification of failed fuel assemblies in a nuclear reactor, the ratios of the tag gas isotopic concentrations are located on curved surfaces to enable the ratios corresponding to failure of a single fuel assembly to be distinguished from those formed from any combination of two or more failed assemblies.

16 Claims, 12 Drawing Figures

3,959,069

METHOD OF PREPARING GAS TAGS FOR IDENTIFICATION OF SINGLE AND MULTIPLE FAILURES OF NUCLEAR REACTOR FUEL ASSEMBLIES

The invention described herein was made in the course of, or under, a contract with the United States Atomic Energy Commission.

BACKGROUND OF THE INVENTION

This invention relates in general to the identification of failed fuel assemblies in a nuclear reactor and in particular to the gas tagging method for fuel failure identification. More particularly, the invention relates to the development of designs to distinguish between single and multiple assembly failures.

The principles of gas tagging of fuel assemblies of a nuclear reactor for detecting fuel failures are well known in the art as may be seen by reference to U.S. Pat. No. 3,663,363, issued on May 16, 1972, to C. E. Crouthamel et al for "Identification of Failed Fuel Elements." In general, gas tagging consists of the addition to nuclear reactor fuel pins of small amounts of gas having a unique isotopic composition for each assembly; when an assembly fails during subsequent irradiation, the tag gas is released along with the fission gas and enables an identification of the defective assembly by a mass spectrometric analysis of the reactor cover gas. Isotopes of inert gaseous elements are normally chosen for the tag gas material because they are chemically inert, have minimal detrimental effect on the fuel pins in an assembly, and typically are non-fission products. A more complete description of methods of loading tag gases into reactor fuel pins is found in Ser. No. 403,309, filed Oct. 3, 1973, in the name of Ira V. Nelson.

Use of a ratio of two isotopic concentrations of a single element (i.e., a "one-ratio" or "one-dimensional" system) as provided in U.S. Pat. No. 3,663,363, supra, effectively eliminates the sensitivity of the mass spectrometer measurements to the chemical and gas dynamaic properties of the isotope. Earlier designs involving ratios of two isotopic concentrations of a single element have incorporated either one-, two-, or three- independent ratios. In order to obtain the maximum resolution of gas ratios for each single assembly, a uniform spacing in each tag ratio was customarily selected.

The difficulty with previous designs for tag gas selection is that there is no way to insure that failure of two or more assemblies will not be confused with that of a single assembly. The prior state-of-the-art, as represented by the work of Omberg and Schenter (Transactions of the American Nuclear Society 16, 215 (1973), is based upon intuitively shifting the gas tag ratio locations away from the normal positions in an orderly two- or three-ratio array in a Cartesian coordinate system. Such a design is limited for two reasons: It does not systematically insure that there will be no confusion between single and multiple failures, and the maximum number of failures occurring simultaneously which has been studied with such a scheme is only two.

Accordingly, it is the object of the present invention to provide a design for the arrangement of the ratios of isotopes of inert, tag gas that will insure that failure of a single assembly can be distinguished from that of more than one assembly.

A more specific object is to provide such a gas tag design which will not compromise the operability nor reliability of the identification of a single failed assembly.

Still another object is to provide such a gas tag ratio design that will function in a reactor with a cover gas comprised of a natural inert element.

Still another object is to provide a gas tag ratio design such that catastrophic failure of the gas tag system will not occur if the inert reactor cover gas of the reactor is contaminated with isotopes of the inert gas used for tagging.

A still further object is to provide a gas tag ratio design which will use existing, commerically available inert gases.

Other objects of the invention will in part be obvious and will in part appear hereafter.

SUMMARY OF THE INVENTION

For gas tagging of the pins of a reactor fuel assembly, the above objects are accomplished with the prescribed use of curved surface designs with which to locate the gas tags in tag ratio space. By this method which utilizes unequal tag ratio spacing (in one or more of three independent tag ratios) to introduce curved surfaces on which to locate the tag ratios in a three dimensional tag ratio space, gas tag systems employing 80unique gas tags of blended mixtures of inert non-radioactive gases, e.g. $^{78}$Kr/$^{80}$Kr, $^{82}$Kr/$^{80}$Kr and $^{126}$Xe/$^{129}$Xe, are provided for a warped sheet, hemisphere and sphere. For the warped sheet the tag ratio factors $(r_i/r_l)$ are $s_x = 1.2$, $s_y = 1.25$, $s_z = 1.2$ or $1.4$. For the hemisphere tag ratio factors $(r_i/r_l)$ are $s_x = 1.2$, $s_y = 1.2$ and $s_z = 1.25$. Finally, for the sphere the tag ratio factors are $s_x = 1.2$, $s_y = 1.2$ and $s_z = 1.25$. In this manner gas tag systems may be designed such that the ratios of each fuel assembly can be distinguished from those ratios corresponding to the failure of any two assemblies which will yield tag ratios lying along a line connecting the two ratios for the failed assemblies.

Advantageously, the use of appropriate curved surface designs, in accordance with this invention, enables the largest volume enclosing such straight lines to be either interior to the convex surface or exterior to the concave surface on which the tag ratios are located, thus systematically insuring that there will be no confusion between a single and any number of multiple failures.

BRIEF DESCRIPTION OF THE DRAWINGS

These and other objects and features of this invention will be better understood and appreciated from the following detailed description of one embodiment thereof. The following detailed description has been selected for purposes of illustration and shown in the accompanying drawings, in which:

FIG. 3a shows the initial sheet of nodes depicting two tag ratios. FIG. 3b depicts warp 1 which is about a line parallel to y-axis. FIG. 3c depicts warp 2 of initial sheet about a line parallel to x axis.

FIG. 3d shows superposition of warp 1 and warp 2 to give a single warped sheet.

DESCRIPTION OF THE PREFERRED EMBODIMENT

Figure 1:
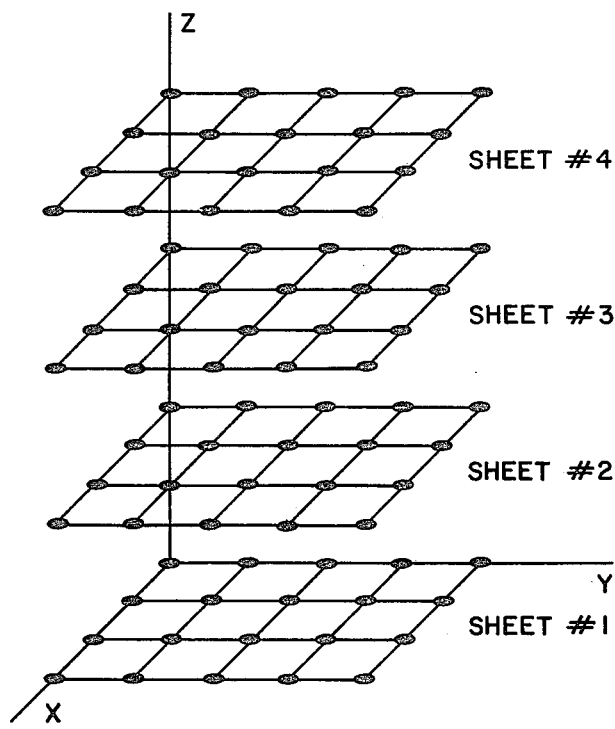
FIG. 1 is a perspective view of a typical design for a set of tag ratios in tag-ratio space, corresponding to a three-ratio or "three-dimensional" scheme, representing the state of the art prior to this invention.
Figure 2:
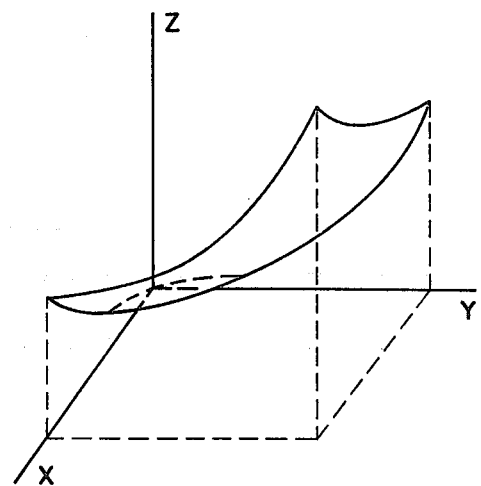
FIG. 2 is a perspective view of a "single warped sheet" design which comprises one embodiment of the present invention.

The gas tag ratio design depicted in FIG. 2 is one embodiment of the invention, and might be referred to as a "warped sheet" design. The tag ratios $r_{x_i}$ and $r_{y_j}$ corresponding to these node locations are calculated with the equations $$r_{x_i}/r_{x_1} = (s_x)^{i-1}, i = 1 \text{ to } I, \quad (1)$$

$$r_{y_j}/r_{y_1} = (s_y)^{j-1}, j = 1 \text{ to } J, \quad (2)$$

where $s_x$ and $s_y$ are the tag ratio spacing factors for the x- and y-directions, respectively. The values of $s_x$ and $s_y$ must be chosen large enough to incorporate the maximum variations in node positions because of burnup and gas blending, as well as a safety factor; $r_x$ and are $r_y$ are the ratios corresponding to the reference node positioned at the origin. The warping of the IJ tag ratios in FIG. 2 is accomplished, as depicted in FIGS. 3a, 3b, 3c and 3d, by specifying that $$r_{z_{ij}}/r_{z_{11}} = (S_z)^{z_{ij}} \quad (3)$$

where $s_z$ is the tag ratio spacing factor in the z-direction and $$Z_{ij} = R_1 + R_2 - R_1\left[1 - \left(\frac{i-1}{R_1}\right)^2\right]^{1/2} - R_2\left[1 - \left(\frac{j-1}{R_2}\right)^2\right]^{1/2}, \quad (4)$$

$$i = 1 \text{ to } I, j = 1 \text{ to } J,$$

for each value of $r_{x_i}$ and $r_{y_j}$ calculated as before. Selection of $r_{z_{ij}}$ in this manner gives a superposition of two rotations, having a radius of curvature $R_1$ about the y-axis and a radius $R_2$ about the x-axis, for the gas ratios originally lying the xy-plane. In order to guarantee that the single assembly failure can be resolved from the multiple assembly failure, it is necessary to avoid warping the sheets with an angular rotation of greater than 90° about either centerline. This condition can be met with the constraints $$R_1 \geq I - 1, R_2 \geq J - 1,$$

in which case the volume enclosing all possible multiple failures lies above the warped sheet.

Figure 4:
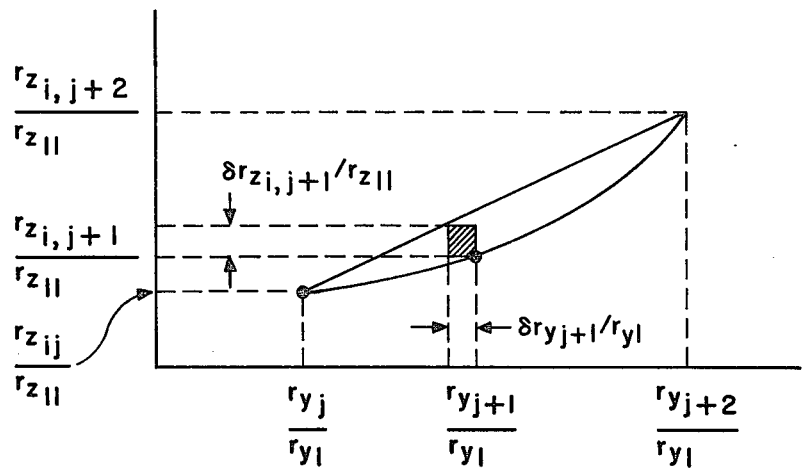
FIG. 4 is a plane view illustrating the spacing between a single failure and the straight line connecting two other failures.

The differences depicted in FIG. 4 in ratio spacing factors in two dimensions, $\delta r_{y_{j+1}}/r_{y_1}$ and $\delta r_{z_i, j+1}/r_{z_{11}}$, allow for resolution between a possible failure of two assemblies with tag ratios $(r_{y_j}/r_{y_1}, r_{z_{ij}}/r_{z_{11}})$ (and $r_{y_{j+2}}/r_{y_1}, r_{z_i, j+2}/r_{z_{11}}$) and a possible failure of the single assembly with tag ratios $(r_{y_{j+1}}/r_{y_1}, r_{z_i, j+1}/r_{z_{11}})$.

A similar pattern would be observed for the differences $\delta r_{x_{i+1}}/r_{x_1}$ and $\delta r_{z_{i+1}, j}/r_{z_{11}}$.

Figure 5:
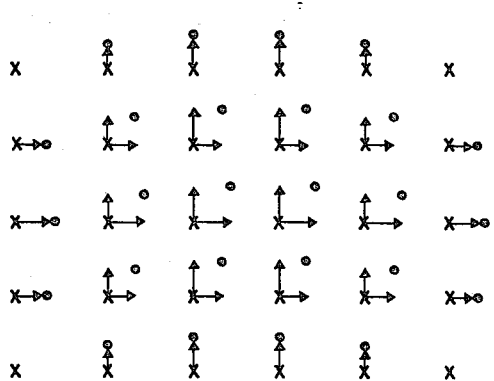
FIG. 5 is a plane view illustrating displaced nodes in a plane with (x) representing node locations before displacement and (.) the node location after displacement.

Another variation of the "warped sheet" design includes the superposition of two displacements for the node locations corresponding to $r_{x_i}$ and $r_{y_j}$. The design depicted in FIG. 5, while not systematically insuring that there will be no confusion between single and multiple failures reduces the number of cases giving such confusion and reduces the reliance upon the ratio $r_{z_{ij}}$ as the sole means of introducing systematic curvature into the design of the tag ratio locations.

Figure 6:
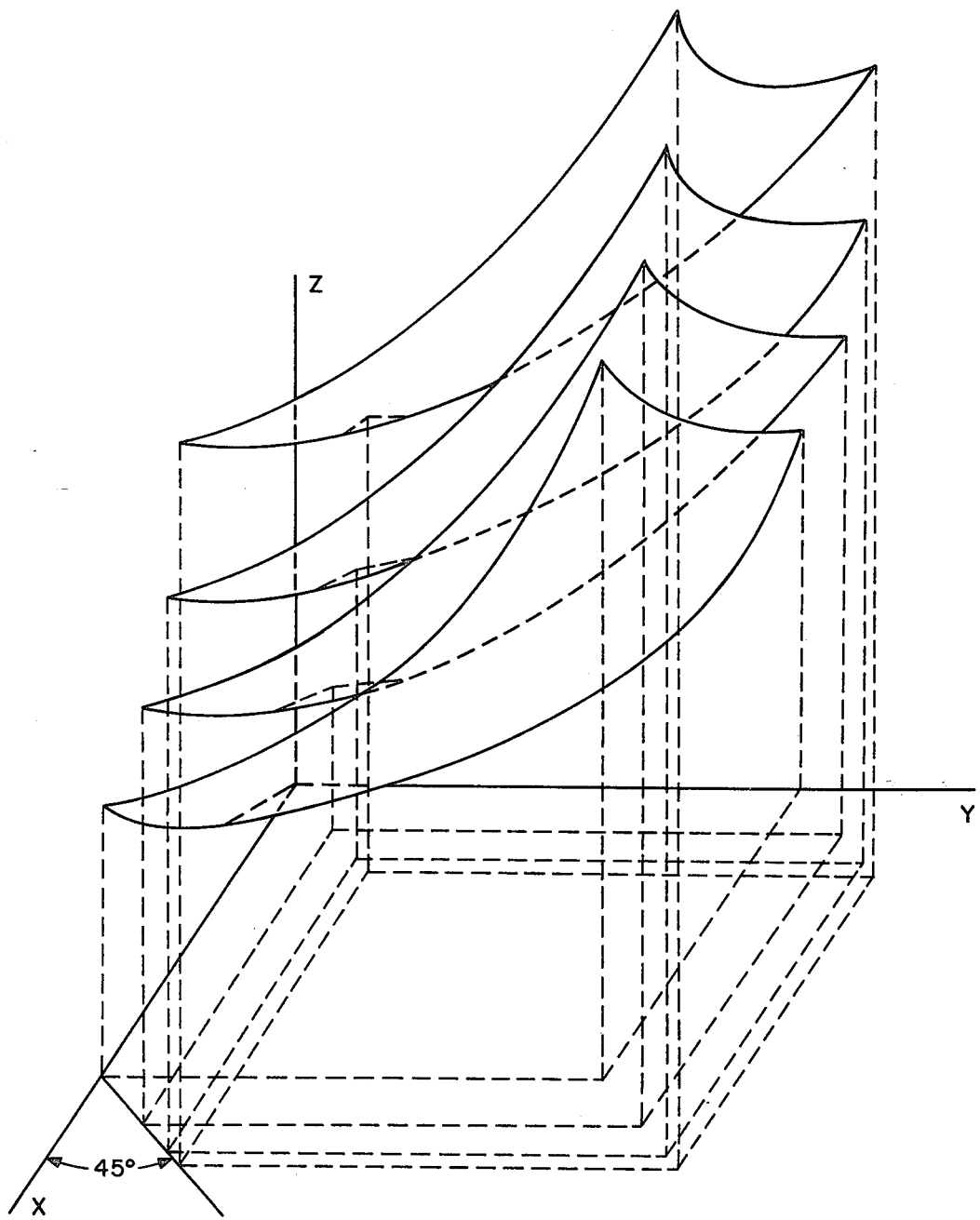
FIG. 6 is a perspective view of a "multiple warped sheet" design.

The design depicted in FIG. 6 represents an alternate design which uses the equations of the single warped sheet to specify a number of tag ratios IJ smaller than the number required. The warped sheets are stacked one on top of another after translating the origin of each sheet to introduce curvature of the gas ratio positions in the z-direction. Such a design can be used to reduce the number of possible cases giving confusion between single and multiple failures, but would not prescribe that no confusion could arise.

Figure 7:
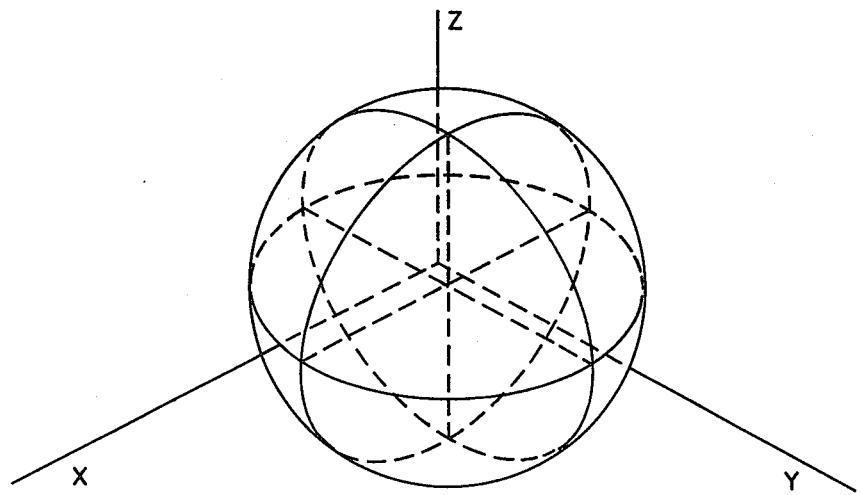
FIG. 7 is a perspective view of a "sphere" design.

The design depicted in FIG. 7, another embodiment of the invention, utilizes the placement of the tag ratios on the surface of a sphere. The gas tag ratio factors, such as the tag ratio factor $r_{x_n}/r_{x_1}$, may be calculated in terms of positions in the xyz-space from $$r_{x_n}/r_{x_1} = s_x\left(\frac{x_n - x_1}{\min|x_{J+1} - x_J|}\right), n = 1 \text{ to } N, \quad (5)$$

where $s_x$ is the minimum tag ratio spacing factor for the x-direction. Use of such an equation automatically guarantees that the tag ratios are sufficiently spaced that there can be no possible confusion between two different single assembly failures provided $s_x$, $s_y$ and $s_z$ are properly chosen. The spatial nodes $x_n$, $y_n$, and $z_n$ can be determined in terms of the geometrical cosines $\epsilon_n$, $\eta_n$, and $\zeta_n$, $n = 1$ to $N$, for a unit sphere about the origin, with the translations $$x_n = \begin{cases} 1 - |\xi_n|, n = 1 \text{ to } N/2, \\ 1 + |\xi_n|, n = (N/2 + 1) \text{ to } N, \end{cases} \quad (6)$$

and similarly for $y_n$ and $z_n$.

One possible arrangement of the geometrical cosines for the design of FIG. 7 is to select the $\xi_n$, $\eta_n$, and $\zeta_n$ from the same set $\mu_n$ in order to preserve phyiscal symmetry. In this case there are N(N+2) points, N = 2, 4, 6 ... on the surface of the unit sphere and the set of direction cosines $\mu_n$ is obtained from $$\mu_n^2 = \mu_1^2 + (n-1)\Delta, n = 1, 2, \ldots N/2. \quad (7)$$

$$\Delta = 2(1 - 3\mu_1^2)/(N-2). \quad (8)$$

To best equalize the spacing between nodes, the last independent value, $\mu_1$, should be determined from $$2\mu_1 = \mu_{N/2} - \mu_{N/2 - 1}. \quad (9)$$

Another variation of the location of tag ratios on the surface of a sphere is to place the ratios on a set of concentric spherical surfaces. Such a scheme can be used to increase the number of unique tag ratio combinations possible for an outer sphere of fixed maximum size, while significantly reducing the number of possible cases giving confusion between single and multiple failures.

Figure 8:
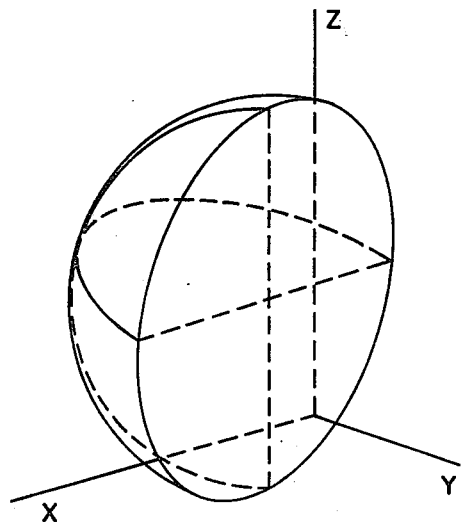
FIG. 8 is a perspective view of a "hemisphere" design.

Another specific embodiment of the invention, as depicted in FIG. 8, utilizes the placement of the tag ratios on the surface of a hemisphere. In this case the design for $N(N+2)/2$ gas ratios can be accomplished in the same way as for the gas ratios depicted in FIG. 7, except that the translations are specified by $$x_n = \begin{cases} 1 - |\xi_n|, & n = 1 \text{ to } N/2, \\ 1 + |\xi_n|, & n = (N/2 + 1) \text{ to } N, \end{cases} \quad (10)$$

$$y_m = \begin{cases} 1 - |\eta_m|, & m = 1 \text{ to } N/2, \\ 1 + |\eta_m|, & m = (N/2 + 1) \text{ to } N, \end{cases} \quad (11)$$

$$z_k = 1 - |\zeta_k|, \quad k = 1 \text{ to } N/2. \quad (12)$$

Figure 9:
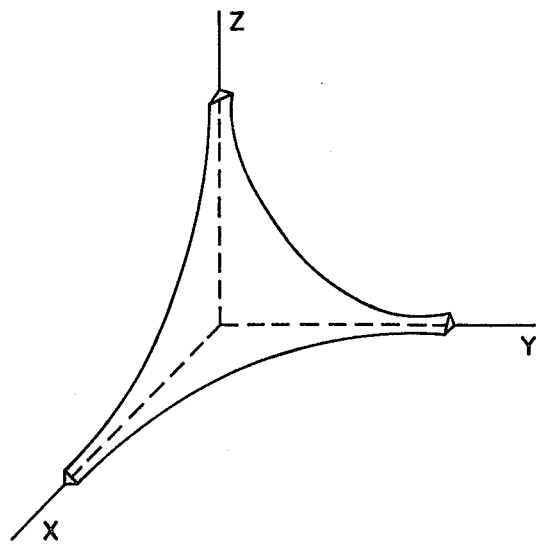
FIG. 9 is a perspective view of a "spherical octant" design.
Figure 3A:
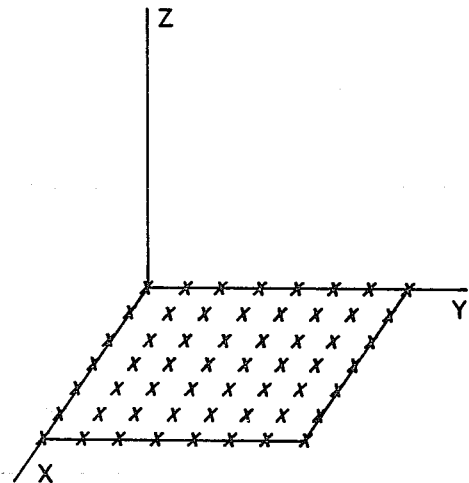
FIGS. 3a–3d are perspective views of how the design in FIG. 2 was obtained.
Figure 3B:
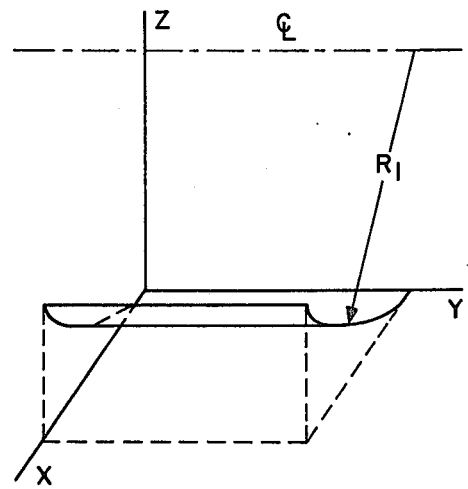
Figure 3C:
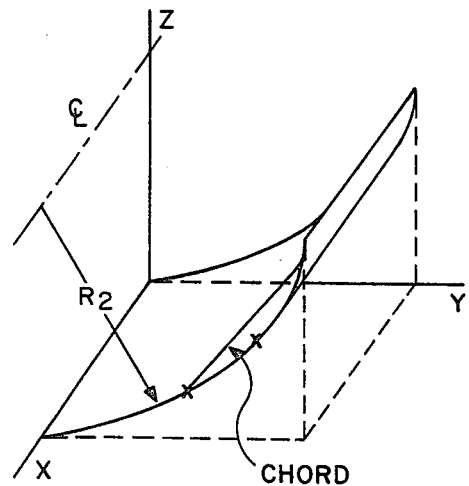
Figure 3D:
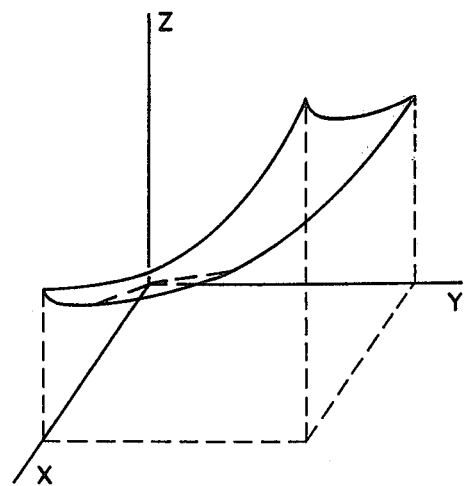

Still another embodiment of the invention, as depicted in FIG. 9, utilizes the placement of the tag ratios on the surface of a spherical octant. In this case the design for $N(N+2)/8$ gas ratios can be accomplished in the same way as for the gas ratios depicted in FIG. 7, except that now $\mu_1$ is specified by the equation $$\mu_1 = 0 \quad (13)$$

and the translations are prescribed by the equation $$x_n = 1 - |\xi_n|, \quad n = 1 \text{ to } N/2, \quad (14)$$

and similarly for $y_m$ and $z_k$.

It is evident from FIGS. 2, 5, 6, 7, 8 and 9 that there are several possible designs utilizing the principle of convex or concave surfaces for location of the nodes. The particular scheme that should be chosen depends upon the difficulites of mixing the gases to get the larger ratios, the costs incurred, and the relative probability that a multiple failure might actually occur.

The design analysis using any of the designs depicted in FIGS. 2, 5, 6, 7, 8 and 9 can be carried out only after first specifying the isotopes of interest. For example, the isotopes krypton-78, krypton-80, krypton-82, and xenon-124, xenon-126, xenon-128 and xenon-129 are excellent tag gas possibilities. The ratios of krypton-82/krypton-80, krypton-78/krypton-80 and xenon-126/xenon-129 vary little over the lifetime exposure of the tag gas in a reactor, and hence for that reason are most promising for use in the Fast Flux Test Facility at Hanford, Washington.

The next step is to determine the values in the reactor cover gas of the ratios of interest in order that the background ratios may be determined. Following this the gas tag ratios corresponding to the reference node at $r_x$, $r_y$, and $r_z$ may be selected after determining the minimum allowable tag ratio spacing factors, i.e., $s_x$, $s_y$, and $s_z$. To minimize the importance of calculations for the shifting of the tag ratios due to exposure of the fuel in the reactor and to account for uncertainties in gas blending techniques and resolution of the detection equipment, these factors should be as large as practical. Suitable factors for a prototypic design for the Fast Flux Test Facility are 1.2 and 1.25 for the two krypton ratios and the xenon ratio, respectively, based upon a preliminary estimate that spacing factors of 1.08 and 1.16, respectively, would provide for 99% confidence limits on cross-sections plus 0.5% uncertainty in ratios due to gas blending in a prototypic, but not "worse case," location of the fuel assembly in the reactor.

In order to insure that the tag ratios will be along be straight line connecting the two ratios when two assemblies fail simultaneously, the following constraints on the gas tag identification system should be satisfied: First, where the gas tags employ more than one ratio from a single element, the same isotope should be used as the denominator in the tag gas ratio. Thus, in the FFTF design where two ratios of krypton isotopes, i.e., $^{82}Kr/^{80}Kr$ and $^{78}Kr/^{80}Kr$, are used with a single ratio of xenon, $^{126}Xe/^{129}Xe$, the isotope $^{80}Kr$ is specified as the denominator of the kryton ratios. Secondly, the amounts of tag gases of the isotope selected as the denominator must be appropriately specified. That is to say, the number of gas atoms of krypton-80 should e adjusted to be equal for all the tags and for the xenon tag gas ratios the number of gas atoms of xenon-129 should be adjusted to be equal for all of the tags. This may conveniently be accomplished by varying the filling pressures of the krypton and xenon gases. Filling pressures for the tag gas system for the FFTF would typically vary by about 10% for xenon and about 30% for krypton. Finally, if there is in the collection of the tag gases any difference in the diffusion rates of escaping krypton and xenon during failure, an appropriate delay in the determination of the sampling and analysis of the cover-gas sample for identification of the failed fuel assembly should be provided.

The equations are then used to calculate the tag ratio factors for the particular design configuration desired. For the single warped sheet and 80 unique gas tags, which is prototypic for the Fast Flux Test Facility, two comparative designs are specified in Table I to illustrate the effect of increasing one of the krypton ratio spacing factors from 1.2 to 1.4.

TABLE I

| | 80 Tag Ratio Factors on a Single Warped Sheet* | | | |
|---|---|---|---|---|
| | Tag Ratio Factors, $r_i/r_1$ | | | |
| Tag Number | $s_x = 1.2$ | $s_y = 1.25$ | $s_z = 1.2$ | $s_z = 1.4$ |
| 1 | 1.0000 | 1.0000 | 1.0000 | 1.0000 |
| 2 | 1.2000 | 1.0000 | 1.0115 | 1.0213 |
| 3 | 1.4400 | 1.0000 | 1.0474 | 1.0892 |
| 4 | 1.7280 | 1.0000 | 1.1123 | 1.2171 |
| 5 | 2.0736 | 1.0000 | 1.2158 | 1.4342 |
| 6 | 2.4883 | 1.0000 | 1.3771 | 1.8049 |
| 7 | 2.9860 | 1.0000 | 1.6386 | 2.4876 |
| 8 | 3.5832 | 1.0000 | 2.1222 | 4.0093 |
| 9 | 4.2998 | 1.0000 | 4.2998 | 14.7579 |
| 10 | 1.0000 | 1.2500 | 1.0115 | 1.0213 |
| 11 | 1.2000 | 1.2500 | 1.0231 | 1.0431 |
| 12 | 1.4400 | 1.2500 | 1.0595 | 1.1125 |
| 13 | 1.7280 | 1.2500 | 1.1251 | 1.2430 |
| 14 | 2.0736 | 1.2500 | 1.2298 | 1.4648 |
| 15 | 2.4883 | 1.2500 | 1.3929 | 1.8434 |
| 16 | 2.9860 | 1.2500 | 1.6574 | 2.5407 |
| 17 | 3.5832 | 1.2500 | 2.1466 | 4.0949 |
| 18 | 4.2998 | 1.2500 | 4.3493 | 15.0728 |
| 19 | 1.0000 | 1.5625 | 1.0474 | 1.0892 |
| 20 | 1.2000 | 1.5625 | 1.0595 | 1.1125 |
| 21 | 1.4400 | 1.5625 | 1.0971 | 1.1864 |
| 22 | 1.7280 | 1.5625 | 1.1650 | 1.3257 |
| 23 | 2.0736 | 1.5625 | 1.2734 | 1.5622 |
| 24 | 2.4883 | 1.5625 | 1.4424 | 1.9660 |
| 25 | 2.9860 | 1.5625 | 1.7162 | 2.7096 |
| 26 | 3.5832 | 1.5625 | 2.2228 | 4.3671 |
| 27 | 4.2998 | 1.5625 | 4.5037 | 16.0748 |
| 28 | 1.0000 | 1.9531 | 1.1123 | 1.2171 |
| 29 | 1.2000 | 1.9531 | 1.1251 | 1.2430 |
| 30 | 1.4400 | 1.9531 | 1.1650 | 1.3257 |
| 31 | 1.7280 | 1.9531 | 1.2372 | 1.4812 |
| 32 | 2.0736 | 1.9531 | 1.3524 | 1.7455 |
| 33 | 2.4833 | 1.9531 | 1.5318 | 2.1967 |

TABLE I-continued

80 Tag Ratio Factors on a Single Warped Sheet*
Tag Ratio Factors, $r_i/r_1$

| Tag Number | $s_x = 1.2$ | $s_y = 1.25$ | $s_z = 1.2$ | $s_z = 1.4$ |
|---|---|---|---|---|
| 34 | 2.9860 | 1.9531 | 1.8226 | 3.0276 |
| 35 | 3.5832 | 1.9531 | 2.3605 | 4.8796 |
| 36 | 4.2998 | 1.9531 | 4.7827 | 17.9611 |
| 37 | 1.0000 | 2.4414 | 1.2158 | 1.4342 |
| 38 | 1.2000 | 2.4414 | 1.2298 | 1.4648 |
| 39 | 1.4400 | 2.4414 | 1.2734 | 1.5622 |
| 40 | 1.7280 | 2.4414 | 1.3524 | 1.7455 |
| 41 | 2.0736 | 2.4414 | 1.4782 | 2.0570 |
| 42 | 2.4883 | 2.4414 | 1.6743 | 2.5887 |
| 43 | 2.9860 | 2.4414 | 1.9922 | 3.5679 |
| 44 | 3.5832 | 2.4414 | 2.5802 | 5.7503 |
| 45 | 4.2998 | 2.4414 | 5.2278 | 21.1662 |
| 46 | 1.0000 | 3.0518 | 1.3771 | 1.8049 |
| 47 | 1.2000 | 3.0518 | 1.3929 | 1.8434 |
| 48 | 1.4400 | 3.0518 | 1.4424 | 1.9660 |
| 49 | 1.7280 | 3.0518 | 1.5318 | 2.1967 |
| 50 | 2.0736 | 3.0518 | 2.6743 | 2.5887 |
| 51 | 2.4883 | 3.0518 | 1.8964 | 3.2577 |
| 52 | 2.9860 | 3.0518 | 2.2564 | 4.4900 |
| 53 | 3.5832 | 3.0518 | 2.9224 | 7.2365 |
| 54 | 4.2998 | 3.0518 | 5.9212 | 26.6366 |
| 55 | 1.0000 | 3.8147 | 1.6386 | 2.4876 |
| 56 | 1.2000 | 3.8147 | 1.6574 | 2.5407 |
| 57 | 1.4400 | 3.8147 | 1.7162 | 2.7096 |
| 58 | 1.7280 | 3.8147 | 1.8226 | 3.0276 |
| 59 | 2.0736 | 3.8147 | 1.9922 | 3.5679 |
| 60 | 2.4883 | 3.8147 | 2.2564 | 4.4900 |
| 61 | 2.9860 | 3.8147 | 2.6849 | 6.1883 |
| 62 | 3.5832 | 3.8147 | 3.4773 | 9.9738 |
| 63 | 4.2998 | 3.8147 | 7.0455 | 36.7123 |
| 64 | 1.0000 | 4.7684 | 2.1222 | 4.0093 |
| 65 | 1.2000 | 4.7684 | 2.1466 | 4.0949 |
| 66 | 1.4400 | 4.7684 | 2.2228 | 4.3671 |
| 67 | 1.7280 | 4.7684 | 2.3605 | 4.8796 |
| 68 | 2.0736 | 4.7684 | 2.5802 | 5.7503 |
| 69 | 2.4883 | 4.7684 | 2.9224 | 7.2365 |
| 70 | 2.9860 | 4.7684 | 3.4773 | 9.9638 |
| 71 | 3.5832 | 4.7684 | 4.5037 | 16.0748 |
| 72 | 4.2998 | 4.7684 | 9.1250 | 59.1694 |
| 73 | 1.0000 | 5.9605 | 4.2998 | 14.7579 |
| 74 | 1.2000 | 5.9605 | 4.3493 | 15.0728 |
| 75 | 1.4400 | 5.9605 | 4.5037 | 16.0748 |
| 76 | 1.7280 | 5.9605 | 4.7827 | 17.9611 |
| 77 | 2.0736 | 5.9605 | 5.2278 | 21.1662 |
| 78 | 2.4883 | 5.9605 | 5.9212 | 26.6366 |
| 79 | 2.9860 | 5.9605 | 7.0455 | 36.7123 |
| 80 | 3.5832 | 5.9605 | 9.1250 | 59.1694 |

*Not necessarily ordered according to increasing fabrication costs

Prototypic designs for the sphere and hemisphere are presented in Tables II and III, respectively.

TABLE II

80 Tag Ratio Factors on a Sphere*
Tag Ratio Factors, $r_i/r_1$

| Tag Number | $s_x = 1.2$ | $s_y = 1.2$ | $s_z = 1.25$ |
|---|---|---|---|
| 1 | 2.493 | 2.493 | 1.000 |
| 2 | 2.992 | 2.493 | 1.000 |
| 3 | 2.493 | 2.992 | 1.000 |
| 4 | 2.992 | 2.992 | 1.000 |
| 5 | 2.493 | 1.522 | 1.250 |
| 6 | 2.992 | 1.522 | 1.250 |
| 7 | 1.522 | 2.493 | 1.250 |
| 8 | 4.901 | 2.493 | 1.250 |
| 9 | 1.522 | 2.992 | 1.250 |
| 10 | 4.901 | 2.992 | 1.250 |
| 11 | 2.493 | 4.901 | 1.250 |
| 12 | 2.992 | 4.901 | 1.250 |
| 13 | 2.493 | 1.200 | 1.672 |
| 14 | 2.992 | 1.200 | 1.672 |
| 15 | 1.522 | 1.522 | 1.672 |
| 16 | 4.901 | 1.522 | 1.672 |
| 17 | 1.200 | 2.493 | 1.672 |
| 18 | 6.213 | 2.493 | 1.672 |
| 19 | 1.200 | 2.992 | 1.672 |
| 20 | 6.213 | 2.992 | 1.672 |
| 21 | 1.522 | 4.901 | 1.672 |
| 22 | 4.901 | 4.901 | 1.672 |
| 23 | 2.493 | 6.213 | 1.672 |
| 24 | 2.992 | 6.213 | 1.672 |
| 25 | 2.493 | 1.000 | 3.059 |
| 26 | 2.992 | 1.000 | 3.059 |
| 27 | 1.522 | 1.200 | 3.059 |

TABLE II-continued

80 Tag Ratio Factors on a Sphere*
Tag Ratio Factors, $r_i/r_1$

| Tag Number | $s_x = 1.2$ | $s_y = 1.2$ | $s_z = 1.25$ |
|---|---|---|---|
| 28 | 4.901 | 1.200 | 3.059 |
| 29 | 1.200 | 1.522 | 3.059 |
| 30 | 6.213 | 1.522 | 3.059 |
| 31 | 1.000 | 2.493 | 3.059 |
| 32 | 7.458 | 2.493 | 3.059 |
| 33 | 1.000 | 2.992 | 3.059 |
| 34 | 7.458 | 2.992 | 3.059 |
| 35 | 1.200 | 4.901 | 3.059 |
| 36 | 6.213 | 4.901 | 3.059 |
| 37 | 1.522 | 6.213 | 3.059 |
| 38 | 4.901 | 6.213 | 3.059 |
| 39 | 2.493 | 7.458 | 3.059 |
| 40 | 2.992 | 7.458 | 3.059 |
| 41 | 2.493 | 1.000 | 3.824 |
| 42 | 2.992 | 1.000 | 3.824 |
| 43 | 1.522 | 1.200 | 3.824 |
| 44 | 4.901 | 1.200 | 3.824 |
| 45 | 1.200 | 1.522 | 3.824 |
| 46 | 6.213 | 1.522 | 3.824 |
| 47 | 1.000 | 2.493 | 3.824 |
| 48 | 7.458 | 2.493 | 3.824 |
| 49 | 1.000 | 2.992 | 3.824 |
| 50 | 7.458 | 2.992 | 3.824 |
| 51 | 1.200 | 4.901 | 3.824 |
| 52 | 6.213 | 4.901 | 3.824 |
| 53 | 1.522 | 6.213 | 3.824 |
| 54 | 4.901 | 6.213 | 3.824 |
| 55 | 2.493 | 7.458 | 3.824 |
| 56 | 2.992 | 7.458 | 3.824 |
| 57 | 2.493 | 1.200 | 6.996 |
| 58 | 2.992 | 1.200 | 6.996 |
| 59 | 1.522 | 1.522 | 6.996 |
| 60 | 4.901 | 1.522 | 6.996 |
| 61 | 1.200 | 2.493 | 6.996 |
| 62 | 6.213 | 2.493 | 6.996 |
| 63 | 1.200 | 2.992 | 6.996 |
| 64 | 6.213 | 2.992 | 6.996 |
| 65 | 1.522 | 4.901 | 6.996 |
| 66 | 4.901 | 4.901 | 6.996 |
| 67 | 2.493 | 6.213 | 6.996 |
| 68 | 2.992 | 6.213 | 6.996 |
| 69 | 2.493 | 1.522 | 9.352 |
| 70 | 2.992 | 1.522 | 9.352 |
| 71 | 1.522 | 2.493 | 9.352 |
| 72 | 4.901 | 2.493 | 9.352 |
| 73 | 1.522 | 2.992 | 9.352 |
| 74 | 4.901 | 2.992 | 9.352 |
| 75 | 2.493 | 4.901 | 9.352 |
| 76 | 2.992 | 4.901 | 9.352 |
| 77 | 2.493 | 2.493 | 11.696 |
| 78 | 2.992 | 2.493 | 11.696 |
| 79 | 2.493 | 2.992 | 11.696 |
| 80 | 2.992 | 2.992 | 11.696 |

*Not necessarily ordered according to increasing fabrication costs.

TABLE III

80 Tag Ratio Factors on a Hemisphere*
Tag Ratio Factors, $r_i/r_1$

| Tag Number | $s_x = 1.2$ | $s_y = 1.2$ | $s_z = 1.25$ |
|---|---|---|---|
| 1 | 5.175 | 5.175 | 1.000 |
| 2 | 6.210 | 5.175 | 1.000 |
| 3 | 5.175 | 6.210 | 1.000 |
| 4 | 6.210 | 6.210 | 1.000 |
| 5 | 5.175 | 2.598 | 1.250 |
| 6 | 6.210 | 2.598 | 1.250 |
| 7 | 2.598 | 5.175 | 1.250 |
| 8 | 12.368 | 5.175 | 1.250 |
| 9 | 2.598 | 6.210 | 1.250 |
| 10 | 12.368 | 6.210 | 1.250 |
| 11 | 5.175 | 12.368 | 1.250 |
| 12 | 6.210 | 12.368 | 1.250 |
| 13 | 5.175 | 1.888 | 1.611 |
| 14 | 6.210 | 1.888 | 1.611 |
| 15 | 2.598 | 2.598 | 1.611 |
| 16 | 12.368 | 2.598 | 1.611 |
| 17 | 1.888 | 5.175 | 1.611 |
| 18 | 17.021 | 5.175 | 1.611 |
| 19 | 1.888 | 6.210 | 1.611 |
| 20 | 17.021 | 6.210 | 1.611 |
| 21 | 2.598 | 12.368 | 1.611 |
| 22 | 12.368 | 12.368 | 1.611 |
| 23 | 5.175 | 17.021 | 1.611 |
| 24 | 6.210 | 17.021 | 1.611 |

TABLE III-continued

80 Tag Ratio Factors on a Hemisphere*

Tag Ratio Factors, $r_i/r_l$

| Tag Number | $s_x = 1.2$ | $s_y = 1.2$ | $s_z = 1.25$ |
|---|---|---|---|
| 25 | 5.175 | 1.477 | 2.176 |
| 26 | 6.210 | 1.477 | 2.176 |
| 27 | 2.598 | 1.888 | 2.176 |
| 28 | 12.368 | 1.888 | 2.176 |
| 29 | 1.888 | 2.598 | 2.176 |
| 30 | 17.021 | 2.598 | 2.176 |
| 31 | 1.477 | 5.175 | 2.176 |
| 32 | 21.759 | 5.175 | 2.176 |
| 33 | 1.477 | 6.210 | 2.176 |
| 34 | 21.759 | 6.210 | 2.176 |
| 35 | 1.888 | 12.368 | 2.176 |
| 36 | 17.021 | 12.368 | 2.176 |
| 37 | 2.598 | 17.021 | 2.176 |
| 38 | 12.368 | 17.021 | 2.176 |
| 39 | 5.175 | 21.759 | 2.176 |
| 40 | 6.210 | 21.759 | 2.176 |
| 41 | 5.175 | 1.200 | 3.217 |
| 42 | 6.210 | 1.200 | 3.217 |
| 43 | 2.598 | 1.477 | 3.217 |
| 44 | 12.368 | 1.477 | 3.217 |
| 45 | 1.888 | 1.888 | 3.217 |
| 46 | 12.368 | 1.888 | 3.217 |
| 47 | 1.477 | 2.598 | 3.217 |
| 48 | 21.759 | 2.598 | 3.217 |
| 49 | 1.200 | 5.175 | 3.217 |
| 50 | 26.769 | 5.175 | 3.217 |
| 51 | 1.200 | 6.210 | 3.217 |
| 52 | 26.769 | 6.210 | 3.217 |
| 53 | 1.477 | 12.368 | 3.217 |
| 54 | 21.759 | 12.368 | 3.217 |
| 55 | 1.888 | 17.021 | 3.217 |
| 56 | 17.021 | 17.021 | 3.217 |
| 57 | 2.598 | 21.759 | 3.217 |
| 58 | 12.368 | 21.759 | 3.217 |
| 59 | 5.175 | 26.769 | 3.217 |
| 60 | 6.210 | 26.769 | 3.217 |
| 61 | 5.175 | 1.000 | 7.477 |
| 62 | 6.210 | 1.000 | 7.477 |
| 63 | 2.598 | 1.200 | 7.477 |
| 64 | 12.368 | 1.200 | 7.477 |
| 65 | 1.888 | 1.477 | 7.477 |
| 66 | 17.021 | 1.477 | 7.477 |
| 67 | 1.477 | 1.888 | 7.477 |
| 68 | 21.759 | 1.888 | 7.477 |
| 69 | 1.200 | 2.598 | 7.477 |
| 70 | 26.769 | 2.598 | 7.477 |
| 71 | 1.000 | 5.175 | 7.477 |
| 72 | 32.132 | 5.175 | 7.477 |
| 73 | 1.000 | 6.210 | 7.477 |
| 74 | 32.132 | 6.210 | 7.477 |
| 75 | 1.200 | 12.368 | 7.477 |
| 76 | 26.769 | 12.368 | 7.477 |
| 77 | 1.477 | 17.021 | 7.477 |
| 78 | 21.759 | 17.01 | 7.477 |
| 79 | 1.888 | 21.759 | 7.477 |
| 80 | 17.021 | 21.759 | 7.477 |

*Not necessarily ordered according to increasing fabrication costs.

The final step to obtaining the gases for insertion into the fuel assemblies is to blend different mixtures of the inert tag gases which have been enriched in one or more of the isotopes of interest.

It is recognized that the designs depicted in FIGS. 2, 5, 6, 7, 8, and 9 have been worked out using fixed gas ratio locations to represent a set of gas tag ratios, whereas burnup of the tag gases will cause a drifting of the locations with time. Also, uncertainties in cross sections used in the burnup calculations cause the actual gas ratio locations to be imprecise. That is, all gas ratio points are actually small volumes and all lines between such locations are actually tubes. The invention presented here, combined with an intuitive shifting of gas ratio locations as with the technique of Omberg and Schenter, supra, can be emloyed to carry out designs even more complex than those presented here, and which still utilize the principle of curved surfaces.

It will be understood by those skilled in the art that various modifications to the present invention may be made without departing from the scope of the invention. It should be apparent that any two assemblies failing simultaneously will give rise to tag ratios lying along a straight line connecting the two ratios if the appropriate quantities of xenon and krypton gas are used in the preparation of tag gases for each fuel pin and if any mass diffusion effects during subsequent collection of the escaped gases are negligible. The specific location of the composite tag gas mixture depends upon the relative amounts of tag gases which escape from the two assemblies. The possiblity of three or more assemblies failing simultaneously may be treated by breaking down the problem to study, one at a time, all combinations of two simultaneous failures. For example, three simultaneous failures form a plane of gas ratios which could be detected and possibly be confused with the ratios lying in the plane and corresponding to some single assembly failure. Four simultaneous failures would give four planes enclosing a volume of tag ratio space for which points within the volume could be confused with one or more single assembly failures cr other combination of failures. The problem of five or more simultaneous failures can be studied by considering the largest volume enclosing straight lines betwen all lthe nodes representing the assemblies which have possibly failed. The use of appropriate curved surface designs of this invention enables the largest volume enclosing such straight lines to be either interior to the convex surface or exterior to the concave surface on which the tag ratios are located thereby insuring that there will be no confusion between a single and any number of multiple failures.

It is therefore understood that all matters contained in the above description are illustrative only and the present invention is to be limited only by the appended claims.

What is claimed is:

1. A method for the identification of failed fuel assemblies in a nuclear reactor having a cover gas therein wherein multiple assembly failures can bne distinguished from single assembly failures comprising the steps of incorporating a blended mixture of inert, non-radioactive gas tags in each fuel pin of each of said fuel assemblies, said blended mixture of inert, non-radioactive gas tags having gas tag ratios that are located on a curved surface or a graphical tag ratio diagram and thereafter monitoring said cover gas for the presence of said blended mixture of said inert, non-radioactive gas tags.

2. The method of claim 1 wherein said curved surface on which said gas tag ratios are located comprises a warped sheet.

3. The method of claim 1 wherein said curved surface on which said gas tag ratios are located comprises mulltiple warped sheets.

4. The method of claim 1 wherein said blended mixture of inert, non-radioactive gas tags comprises ratios of $^{78}Kr/^{80}Kr$, $^{82}Kr/^{80}Kr$ and $^{126}Xe/^{129}Xe$, said ratios being selected from the equation $$r_{x_i}/r_{x_1} = (s_x)^{i-1}, i = 1 \text{ to } I,$$

$$r_{y_j}/r_{y_1} = (s_y)^{j-1}, j = 1 \text{ to } J,$$

where
$s_x$ and $s_y$ are the tag ratio spacing factors for the x- and y-directions, respectively
and specifying that $$r_{z_{ij}}/r_{z_{11}} = (s_z)^{ij},$$

where $s_z$ is the tag ratio spacing factor in the z-direction and $$z_{ij} = R_1 + R_2 - R_1\left[1 - \left(\frac{i-1}{R_1}\right)^2\right]^{1/2} - R_2\left[1 - \left(\frac{j-1}{R_2}\right)^2\right]^{1/2},$$

$i = 1$ to $I$, $j = 1$ to $J$, for each value of $r_{x_i}$ and $r_{y_j}$ calculated above and where $R_1$ is the radius of curvature about the y-axis and $R_2$ is the radius of curvature about the x-axis for the gas ratios originally lying in the xy- plane; and specifying the constraints $$R_1 \geq I - 1, R_2 \geq J - 1.$$

5. The method of claim 1 wherein said curved surface on which said gas tag ratios are located comprises a sphere.

6. The method of claim 1 wherein said curved surface on which said gas tag ratios are located comprises a hemisphere.

7. The method of claim 1 wherein said curved surface on which said gas tag ratios are located comprise a spherical octant.

8. The method of claim 1 wherein said blended mixture of inert, non-radioactive gas tags comprises approximately 2 atm. cm$^3$ per fuel pin.

9. The method of claim 1 wherein said nuclear reactor comprises a liquid sodium fast breeder reactor, said cover gas comprises argon, said blended mixture of inert, non-radioactive gas tags comprises ratios of $^{78}$Kr/$^{80}$Kr, $^{82}$Kr/$^{80}$Kr and $^{126}$Xe/$^{129}$Xe and said monitoring step is conducted by sampling said cover gas, separating said Kr,Xe isotopes from the bulk of said cover gas and passing the resultant separated Kr and Xe isotopes through a mass spectrometer.

10. In a method for selecting gas tags for a nuclear reactor having a cover gas therein, the improvement comprising incorporating a blended mixture of inert, non-radioactive gas tags in each fuel pin of each fuel assembly, said blended mixture of inert, non-radioactive gas tags having gas tag ratios that are located on a curved surface on a graphical tag ratio diagram thereby enabling the gas tag ratios corresponding to a failure of a single fuel assembly to be distinguished from multiple assembly failures.

11. The method of claim 10 wherein said gas tags comprise 80 unique ratios of blended mixtures of $^{78}$Kr/$^{80}$Kr, $^{82}$Kr/$^{80}$Kr and $^{126}$Xe/$^{129}$Xe having the tag ratio factors given in Table I for the warped sheet.

12. The method of claim 11 wherein said blended mixture has the tag ratio factors given in Table II for the sphere.

13. The method of claim 11 wherein said blended mixture has the tag ratio factors given in Table III for the hemisphere.

14. The method of claim 10 wherein said blended mixture of inert, non-radioaoctive gas tags comprises approximately 2 atm. cm$^3$ per fuel pin.

15. The method of claim 10 wherein gas tag ratios of said blended mixture of inert, non-radioactive gas tags comprise unequal tag ratio spacing in one or more of three independent gas tag ratios to thereby introduce a curve surface on which to locate the gas tag ratios in a three dimensional tag ratio space.

16. A method for identification of failed fuel assemblies in a nuclear reactor having a cover gas therein wherein multiple assembly failures can be distinguished from single assembly failures comprising the steps of incorporating a blended mixture of inert, non-radioactive gas tags in each fuel pin of each of said fuel assemblies, said blended mixture of inert, non-radioactive gas tags having gas tag ratios that are located on a plane surface with tag ratios systematically shifted with respect to the initial positions on a Cartesian grid to lie along curved lines and thereafter monitoring said cover gas for the presence of said blended mixture of said inert, non-radioactive gas tags.

* * * * *